United States Patent
Schwarzl et al.

(10) Patent No.: US 9,283,504 B2
(45) Date of Patent: Mar. 15, 2016

(54) BAG FILTER FOR CLEANING DUST-LADEN GASES AND INJECTOR NOZZLE FOR SUCH A BAG FILTER

(75) Inventors: Günter Schwarzl, Ried Im Innkreis (AT); Manfred Lisberger, Riedau (AT); Jürgen Daxdobler, Schildorn (AT); Josef Helml, Reichersberg (AT)

(73) Assignee: Scheuch GmbH, Aurolzmuenster (AT)

( * ) Notice: Subject to any disclaimer, the term of this patent is extended or adjusted under 35 U.S.C. 154(b) by 140 days.

(21) Appl. No.: 14/009,892

(22) PCT Filed: Apr. 4, 2012

(86) PCT No.: PCT/AT2012/000091
§ 371 (c)(1),
(2), (4) Date: Oct. 4, 2013

(87) PCT Pub. No.: WO2012/135881
PCT Pub. Date: Oct. 11, 2012

(65) Prior Publication Data
US 2014/0020345 A1    Jan. 23, 2014

(30) Foreign Application Priority Data
Apr. 4, 2011 (AT) .................. A 472/2011

(51) Int. Cl.
*B01D 46/00* (2006.01)
*B01D 46/04* (2006.01)
*B01D 46/06* (2006.01)

(52) U.S. Cl.
CPC ............ *B01D 46/04* (2013.01); *B01D 46/0068* (2013.01); *B01D 46/06* (2013.01); *B01D 2275/208* (2013.01)

(58) Field of Classification Search
CPC ........ B01D 46/04; B01D 46/06; B01D 46/68; B01D 46/02
USPC ............ 55/302, 320, 377–378; 429/143, 147; 210/137, 258; 15/352
See application file for complete search history.

(56) References Cited

U.S. PATENT DOCUMENTS 7,311,491 B2    12/2007   Desbiolles

FOREIGN PATENT DOCUMENTS

| AT | 377711 B | 4/1985 |
| DE | 2325666 A1 | 12/1974 |

(Continued)

*Primary Examiner* — Jason M Greene
*Assistant Examiner* — Karla Hawkins
(74) *Attorney, Agent, or Firm* — Laurence A. Greenberg; Werner H. Stemer; Ralph E. Locher

(57) ABSTRACT

A bag filter assembly for cleaning dust-laden gases has a housing, which is divided into a filtered-gas side and an unfiltered-gas side by a bag bottom formed with openings. Several filter bags with a flat cross-section and support baskets are arranged in the bag bottom openings. The filter bags have support baskets and injector nozzle at the open end for conducting and accelerating compressed-air pulses for dedusting. The injector nozzle protrudes at least partially into the openings of the bag bottom. Sealing elements are arranged on the outside of the injector nozzle at the level of the bag bottom in order to form a defined gap for a defined compression of the filter bag between the sealing elements and the jacket surface of the opening in the bag bottom and thus to independently seal the filter bag with respect to the opening of the bag bottom.

20 Claims, 6 Drawing Sheets

(56) References Cited

FOREIGN PATENT DOCUMENTS

| | | | |
|---|---|---|---|
| DE | 2345722 | A1 | 3/1975 |
| DE | 20000648 | U1 | 5/2000 |
| DE | 102009016145 | A1 | 10/2010 |
| EP | 0848980 | A1 | 6/1998 |
| FR | 2218922 | A1 | 9/1974 |
| GB | 1016556 | A | 1/1966 |
| GB | 1461351 | A | 1/1977 |

BAG FILTER FOR CLEANING DUST-LADEN GASES AND INJECTOR NOZZLE FOR SUCH A BAG FILTER

BACKGROUND OF THE INVENTION

Field of the Invention

The invention relates to a bag filter for cleaning dust-laden gases, comprising a housing, which is divided into a filtered-gas side and an unfiltered-gas side by a bag bottom having openings, in which housing several filter bags having a flat cross-section and a closed end and an open end are arranged in the openings of the bag bottom, wherein the dust-laden gases may be applied to said filter bags from the outside and the cleaned gases may be discharged through the open ends, having elements for the output of compressed-air pulses into the open ends of the filter bags for dedusting the filter bags, with support baskets being arranged in each filter bag.

The invention further relates to an injector nozzle for the filter bags of such a bag filter, protruding at least partially into the opening of the bag bottom.

Bag filters are used for separating solids such as chips, dusts and the like from the air and/or exhaust gases. Examples for fields of application include the wood-processing industry, the metal industry, the industrial minerals industry as well as the cleaning of exhaust gases. Dust filters usually comprise a housing which is divided into a filtered-gas side and an unfiltered-gas side by a bag bottom having openings. The filter bags are arranged in the openings of the bag bottom in a vertical or horizontal orientation and sealed accordingly so that no dust-laden gas can travel from the unfiltered-gas side to the filtered-gas side without being filtered.

AT 377 711 B and EP 848 980 B1, for example, describe such bag filters. The filter bags usually have a circular cross-section and include a snap ring at the open end for arranging the filter bags in the openings of the bag bottom without the use of tools. The sealing of the filter bags with respect to the opening in the bag bottom is usually done without additional devices except for possible holding elements that hold the upper open end of the filter bag in the opening of the bag bottom.

Filter bags with a circular cross-section, however, suffer from the drawback that the relation between filter area, i. e. the outer surface of the filter bag, and inner volume is relatively disadvantageous. As a consequence, filter bags with flat cross-sections are also available, for example with slot hole-shaped cross-sections or oval cross-sections, having a more favourable relation between filter area and inner volume than filter bags having circular cross-sections. Disadvantages of filter bags with flat cross-sections, however, are the facts that they provide weaker dedusting effects due to the flat cross-sections and thus worse filtering capabilities as well as the more labour-intensive and more difficult mounting of the bags and the required sealing of the filter bags by means of clamping or tensioning members. In a filter bag with a flat cross-section, for example slot hole-shaped, a sufficient sealing with respect to the opening in the bag bottom cannot be obtained without additional auxiliary measures as this might cause leaks in the longitudinal region of the filter bag. In known bag filters having filter bags with flat cross-sections, the sealing with respect to the opening in the bag bottom is effected by structures that press the upper end of the filter bags against the bag bottom in order to obtain an appropriate sealing effect. Because of the required sealing step, however, the mounting of such bag filters is very labour-intensive and costly.

Moreover, in bag filters having filter bags with flat cross-sections, a parallel orientation of the filter bags with respect to each other is only possible with the aid of auxiliary means such as appropriate bag guides.

Due to the existing disadvantages of such bag filters having filter bags with flat cross-sections they are not yet in common use. If the disadvantages could be eliminated and/or at least reduced, bag filters having filter bags with flat cross-sections and reduced volume could have equal cleaning effects as bag filters having filter bags with circular cross-sections, and/or a larger throughput of air could be obtained using filter arrangements of the same size.

BRIEF SUMMARY OF THE INVENTION

It is thus the object of the present invention to provide an above bag filter wherein the filter bags, support baskets and injector nozzle may be mounted and demounted as swiftly and easily as possible and a reliable sealing with respect to the bag bottom may be established without complex constructional auxiliary means, and the function of the bag filter may be improved and produced as cost-efficiently as possible. The disadvantages of known bag filters having filter bags with flat cross-sections should be avoided or at least reduced.

A further object of the present invention is to provide an injector nozzle for an above bag filter which makes it possible to simplify mounting and demounting and obtain the best possible cleaning effect.

The first object according to the invention is achieved by an above bag filter, wherein each support basket is connected at the end associated with the open end of the respective filter bag to an injector nozzle for conducting and accelerating the dedusting compressed-air pulses, which injector nozzle protrudes at least partially into the opening of the bag bottom, and sealing elements are arranged on the outside of the injector nozzle at the height of the bag bottom in order to form a defined gap for a defined compression of the filter bag between the sealing elements and the jacket surface of the opening in the bag bottom and thus to independently seal the filter bag with respect to the opening of the bag bottom. By the specifically designed injector nozzle included in the construction of the bag filter according to the invention, an easier and swifter way of mounting the filter bags in the housing of the bag filter is provided as well as an automatic sealing of the end of the filter bag with respect to the opening in the bag bottom without requiring additional structures or measures. The sealing of the filter bag with respect to the bag bottom is done automatically and exclusively by inserting the injector nozzle into the open end of the filter bag. Moreover, the injector nozzle improves the dedusting of the filter bag.

According to another feature of the invention, each injector nozzle is formed by a funnel-shaped mouth expanding towards the elements for the output of compressed-air pulses. The funnel-shaped expanding mouth of the injector nozzle makes it possible to conduct substantially all of the compressed air from the elements for the output of compressed-air pulses into the open filter bags and accelerate it in order to use the entire power of the compressed-air pulses for dedusting. In turn, the enhanced dedusting effect improves the filtering capabilities of the filter bag.

The ratio between the smallest width of the injector nozzle and the width of the mouth of the injector nozzle is preferably 1:2 to 1:4, particularly preferably 1:2.5.

In the simplest case, the sealing elements are formed by at least one bulge on the injector nozzle by which the filter bag may be pressed against the jacket surface of the opening in the bag bottom. The injector nozzle is preferably made of sheet metal and at the height of the bag bottom, with the bulges being formed by suitable embossing dies. At least at the longitudinal side, the bulges press the flat filter bags against the jacket surface of the openings in the bag bottom, thus providing a perfect sealing. The design guarantees the creation of a defined gap between the outside of the sealing element, i. e. the bulge on the injector nozzle, and the jacket surface of the opening in the bag bottom, said gap being wide enough to compress the material of the filter bag sufficiently for a complete tightness between the unfiltered-gas side and the filtered-gas side of the bag filter to be obtained. Depending on the design of the convection of the upper open end of the filter bag to the opening in the bag bottom, at least one bulge on each longitudinal side of the injector nozzle or a circumferential bulge around the injector nozzle may be arranged.

Advantageously each filter bag is provided with a ring-shaped ridge on the outside at the open end, the outer diameter of the ring-shaped ridge being larger than the outer diameter of the opening in the bag bottom so the ring-shaped ridge of the filter bag rests on the bag bottom. In such an embodiment of the filter bags, the filter bag may be mounted by simply hooking it into the openings in the bag bottom. Thereafter the support baskets are inserted, and finally fixing the filter bags and sealing is accomplished by arranging the injector nozzles designed according to the invention. In this case it is advantageous for the sealing element on the injector nozzle to be arranged circumferentially in order to create a defined gap for a defined compression of the filter bag along the entire opening in the bag bottom. A structure for holding down the filter bags is not required, at least not when the filter bags are arranged vertically in the bag filter.

In a similar manner, the open end of each filter bag may be provided with a spring ring and two ring-shaped elevations on the outside, between which elevations a ring-shaped groove is formed for creating a snap fit with the opening in the bag bottom. If the filter bags are designed with snap rings, the sealing elements on the injector nozzle just need to be arranged on the longitudinal side in order to obtain a sufficient sealing effect.

For the vertical arrangement of the filter bags in the bag filter it is advantageous to arrange elements for resting against the bag bottom on each injector nozzle. Such resting elements and/or feet make it possible to hold the filter bags in a straight position without additional bag guides, thus allowing a parallel arrangement of the filter bags with respect to each other in case an appropriate connection is provided between the injector nozzle and the support basket and/or they are formed integrally.

With a horizontal orientation of the filter bags in the bag filter, elements for the support baskets to rest on might be required. At least the ends of the support baskets are placed on these resting elements, thereby establishing a parallel arrangement of all filter bags with respect to each other.

For an ideal ratio between filter area and inner volume of the filter bags they have a cross-section with a length/width ratio of at least 4:1.

The elements for the output of compressed-air pulses are preferably formed by blowing jet pipes, each having two openings arranged adjacent to each other per filter bag, wherein the blowing jet pipes are connected to an appropriate compressed air source. Such an arrangement of at least two openings arranged adjacent to each other for the output of compressed-air pulses per filter bag may allow an ideal dedusting of the filter bags having flat cross-sections. Here, the at least two openings are arranged along the longitudinal axis of the cross-section of the filter bag.

Advantageously, each support basket is connected to the injector nozzle releasably without the use of tools. For example, latching connections may be provided, connecting the support basket and the injector nozzle automatically upon pushing the injector nozzle into the open end of the filter bag.

Alternatively, each support basket may be formed integrally with the injector nozzle. In particular when the support baskets have short lengths, this design is advantageous because it is possible to introduce the support basket into the filter bag and seal the filter bag with respect to the opening in the bag bottom in a single step.

The second object according to the invention is achieved by an above injector nozzle for the filter bags of an above bag filter, wherein sealing elements are arranged on the outside of the injector nozzle at a height corresponding to the height of the bag bottom when the injector nozzle is in its operating position, in order to form a defined gap for a defined compression of the filter bag between the sealing elements and the jacket surface of the opening in the bag bottom and thus to independently seal the filter bag with respect to the opening of the bag bottom. As has already been mentioned above, such an injector nozzle allows to combine the sealing and injector functions. Should the injector nozzle be formed integrally with the support basket, the supporting function is provided at the same time as well.

For the embodiments of the injector nozzle according to the invention reference is made to the above description of the bag filter.

The present invention will be explained in more detail by means of the attached drawings.

DESCRIPTION OF THE INVENTION

Figure 1:
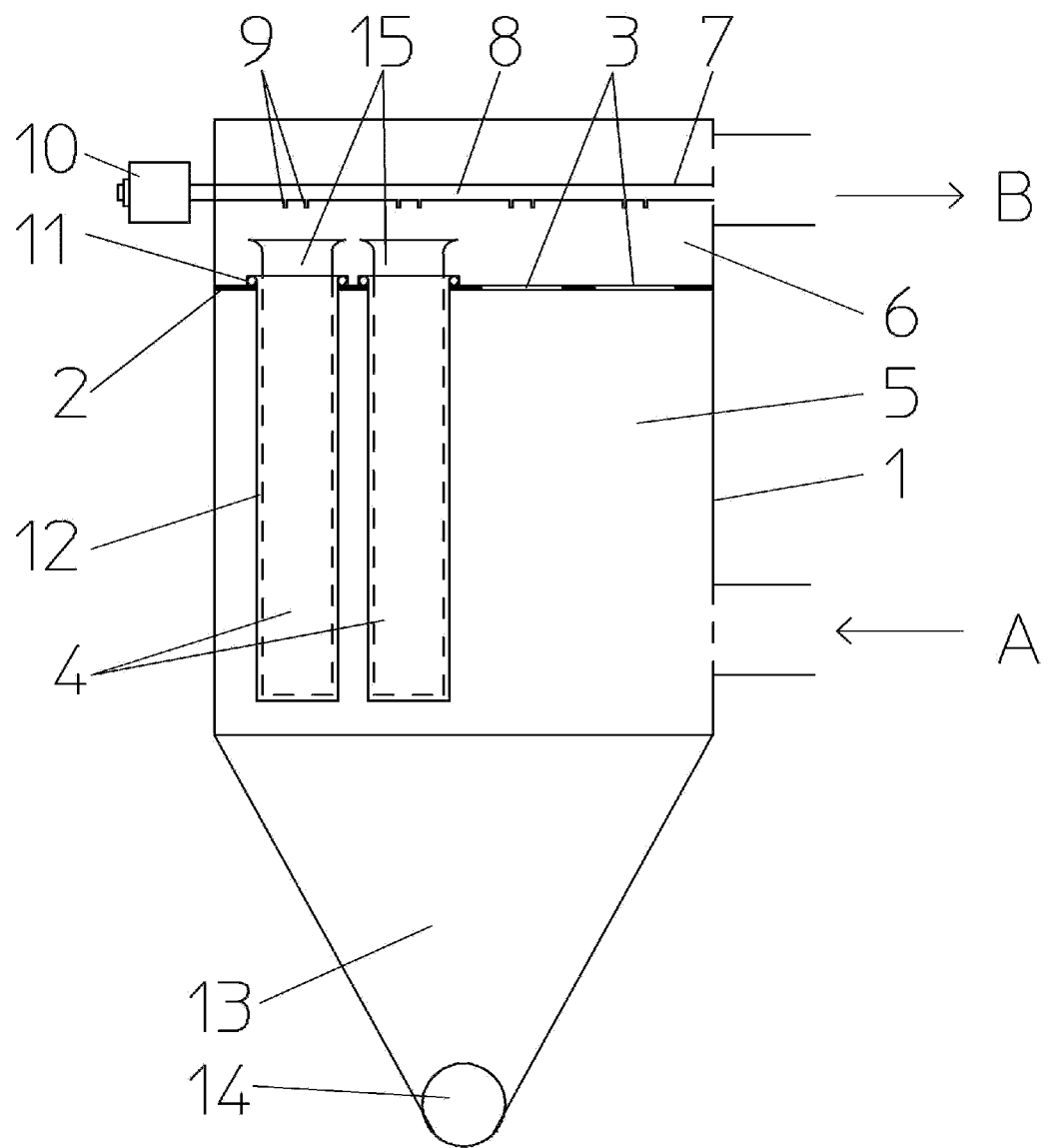
FIG. 1 shows a schematic illustration of a cross-section of a bag filter.

FIG. 1 shows a cross-section of a bag filter of a known type of design. In a housing 1, there is a bag bottom 2 with openings 3 in which the corresponding filter bags 4 are arranged or into which they are hooked. The dust-laden gases A are introduced into the unfiltered-gas side 5 of the bag filter. The filter bags 4 have an open upper end and a closed lower end. The dust-laden gases A flow through the material of the filter bags 4 and reach the filtered-gas side 6 of the bag filter via the openings 3 in the bag bottom 2. From there, the clean gases B are discharged accordingly. In the filtered-gas side 6 of the bag filter, elements 7 for the output of compressed-air pulses are arranged within the open ends of the filter bags 4 for dedusting the filter bags. These elements 7 for the output of compressed-air pulses may be formed, for example, by appropriately designed blowing jet pipes 8 having openings 9 above each filter bag 4 and a corresponding compressed air source 10 connected to the blowing jet pipes 8. In regular time intervals or intervals according to the dusting of the filter bags 4, compressed-air pulses are blown into the filter bags 4 via the openings 9 of the blowing jet pipes 8, and the dust sticking to the outside of the filter bags 4 is removed. To prevent the filter bags 4, which are made of a textile material, from collapsing, support baskets 12 are arranged within the filter bags 4 for stabilising them. The filter cake separated during the dedusting of the filter bags 4 is discharged via a collector funnel 13 and possibly a discharge device 14. In order to establish a sealing of the filter bags 4 with respect to the openings 3 in the bag bottom 2, appropriate sealing elements 11 are required. With filter bags 4 having a flat cross-section, in particular, such a sealing is rather difficult to establish.

Figure 2:
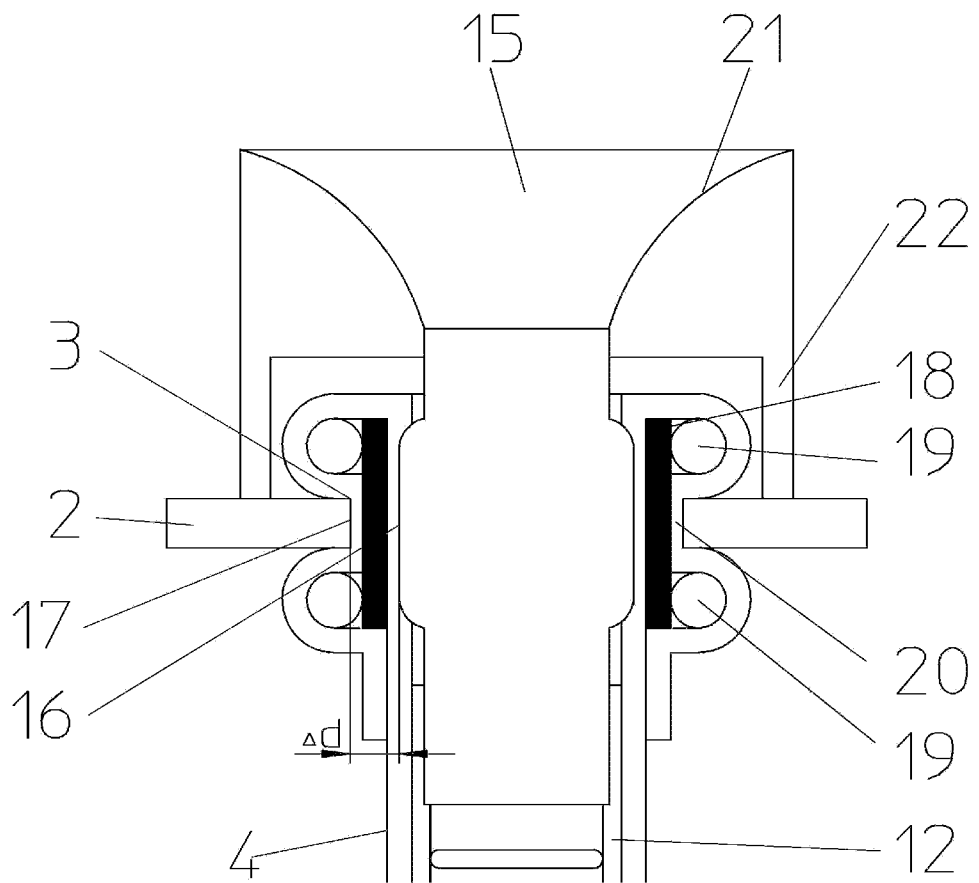
FIG. 2 shows a cross-section of an injector nozzle designed according to the invention for attaching a filter bag designed with a snap ring.

FIG. 2 shows an embodiment of the present invention wherein an injector nozzle 15 is provided, which is used for conducting and accelerating the compressed-air pulses from the element 7 for the output of compressed-air pulses as well as for sealing the filter bag 4 with respect to the opening 3 in the bag bottom 2. For this purpose, sealing elements 16 are arranged on the outside of the injector nozzle 15 at the height of the bag bottom 2 in order to form a defined gap Δd for a defined compression of the filter bag 4 between the sealing elements 16 and the jacket surface 17 of the opening 3 in the bag bottom 2 and thus to independently seal the filter bag 4 with respect to the opening 3 of the bag bottom 2. In the exemplary embodiment illustrated in FIG. 2, the open end of the filter bag 4 is provided with a spring ring 18 having two ring-shaped elevations 19 on the outside, between which elevations 19 a ring-shaped groove 20 is formed for creating a snap fit with the opening 3 in the bag bottom 2. By means of the sealing elements 16 on the outside of the injector nozzle 15, the filter bag 4 is pressed against the jacket surface 17 of the opening 3 in the bag bottom 2 on the longitudinal side and an appropriate sealing is obtained without additional measures. Preferably, the injector nozzle 15 has a funnel-shaped mouth 21 expanding towards the elements 7 for the output of compressed-air pulses. The ratio between the smallest width of the injector nozzle 15 and the width of the mouth 21 may be 1:2 to 1:4, preferably 1:2.5. In a vertical arrangement of the filter bags 4, in particular, it may be advantageous for elements 22 for resting against the bag bottom 2 to be arranged on the injector nozzle 15. These will provide for a straight orientation of the filter bags 4 and/or the support baskets 12 arranged therein without additional bag guides.

Figure 3:
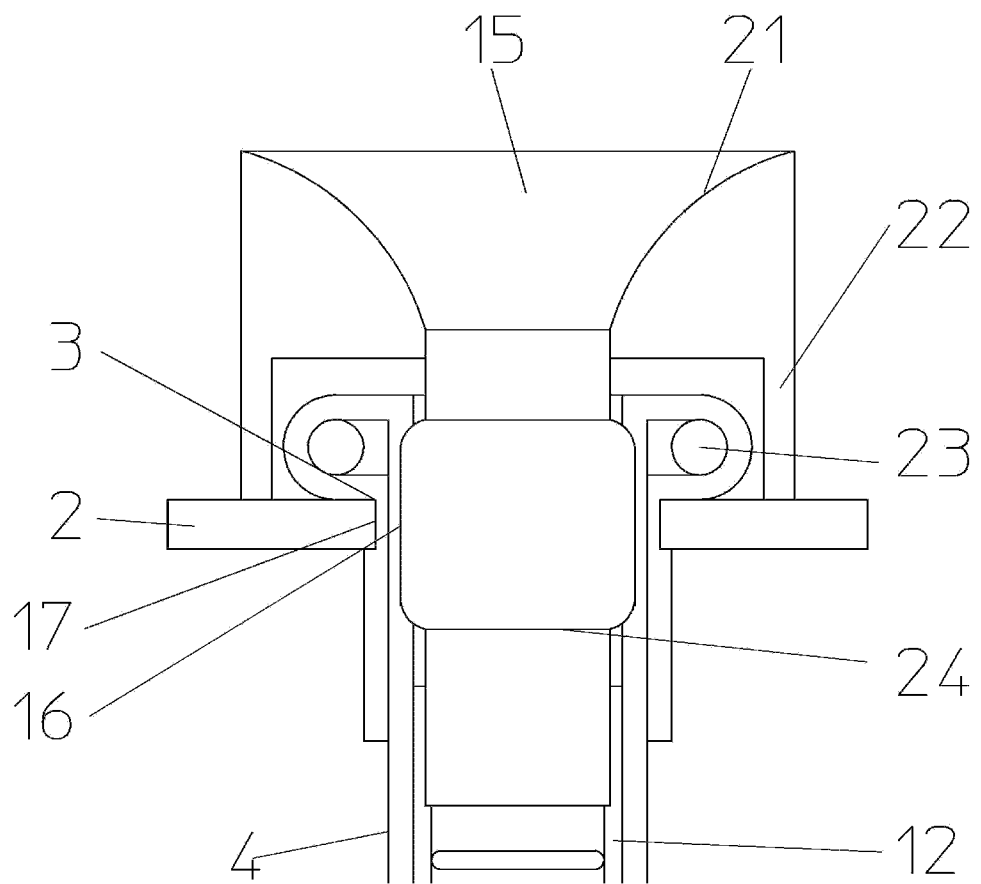
FIG. 3 shows an amended embodiment of an injector nozzle for attaching an end of a filter bag provided with a ring-shaped ridge.

FIG. 3 shows an amended form of a bag filter with respect to FIG. 2, wherein the upper open end of the filter bag 4 includes a ring-shaped ridge 23 on the outside, resting on the bag bottom 2. In order to obtain a sealing of the filter bag 4 with respect to the opening 3 in the bag bottom 2 in this case, a sealing element 16 formed by a circumferential bulge 24 is preferably provided on the injector nozzle 15. This embodiment is especially suitable for vertically arranged filter bags 4.

Figure 4:
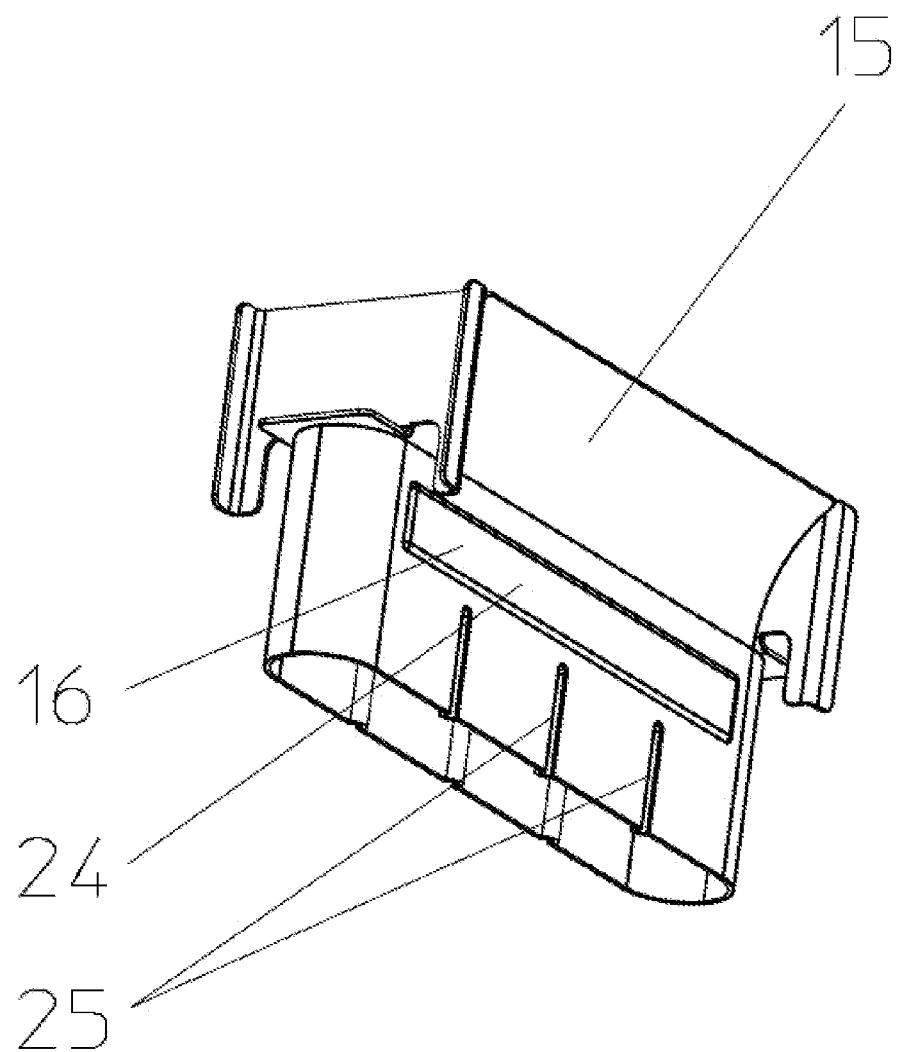
FIG. 4 shows a perspective view of a variation of an injector nozzle.

FIG. 4 shows a perspective view of an injector nozzle 15, wherein the sealing element 16 can be seen clearly in the form of a bulge 24 on the longitudinal side. The injector nozzle 15 also includes appropriate elements 25 for connecting to a support basket 12, preferably releasably without the use of tools, which may be formed by openings for the elements of the support basket 12 to latch onto, for example.

Figure 5:
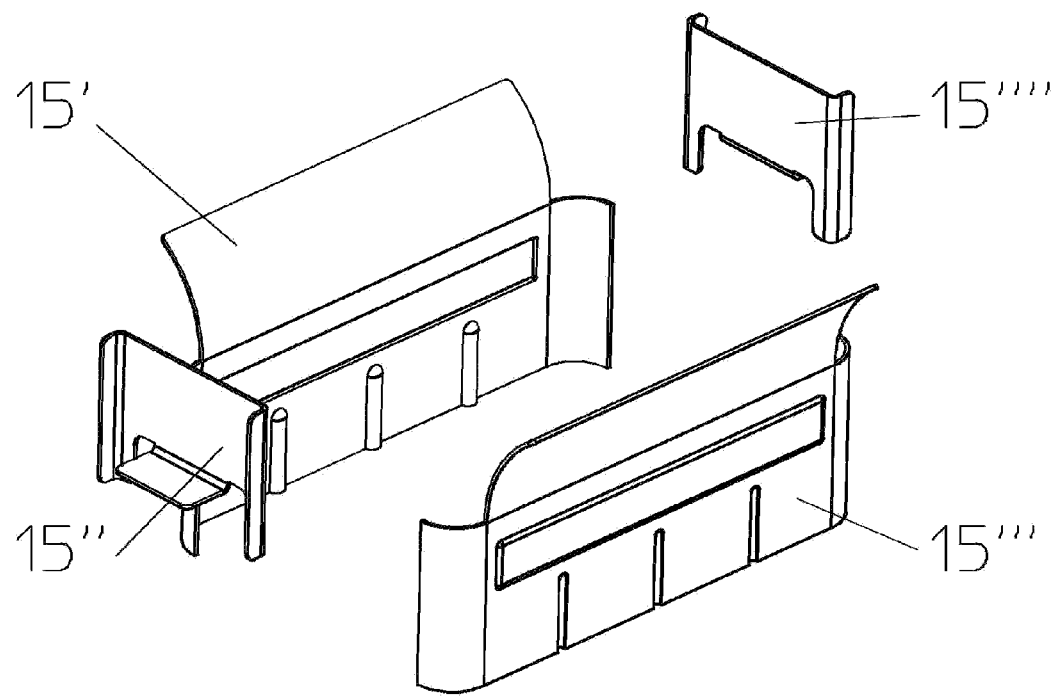
FIG. 5 shows an injector nozzle composed of four parts according to FIG. 4.

FIG. 5 shows a possible assembly of an injector nozzle 15 comprised of four sheet metal parts 15', 15'', 15''' and 15'''', wherein two parts 15', 15''' and 15'', 15'''', respectively, are of identical form. In this manner, the injector nozzle 15 may be produced very swiftly and cost-efficiently. Likewise, it is possible to manufacture the injector nozzle 15 from one sheet metal part by bending and bonding, for example by a welding method.

Figure 6:
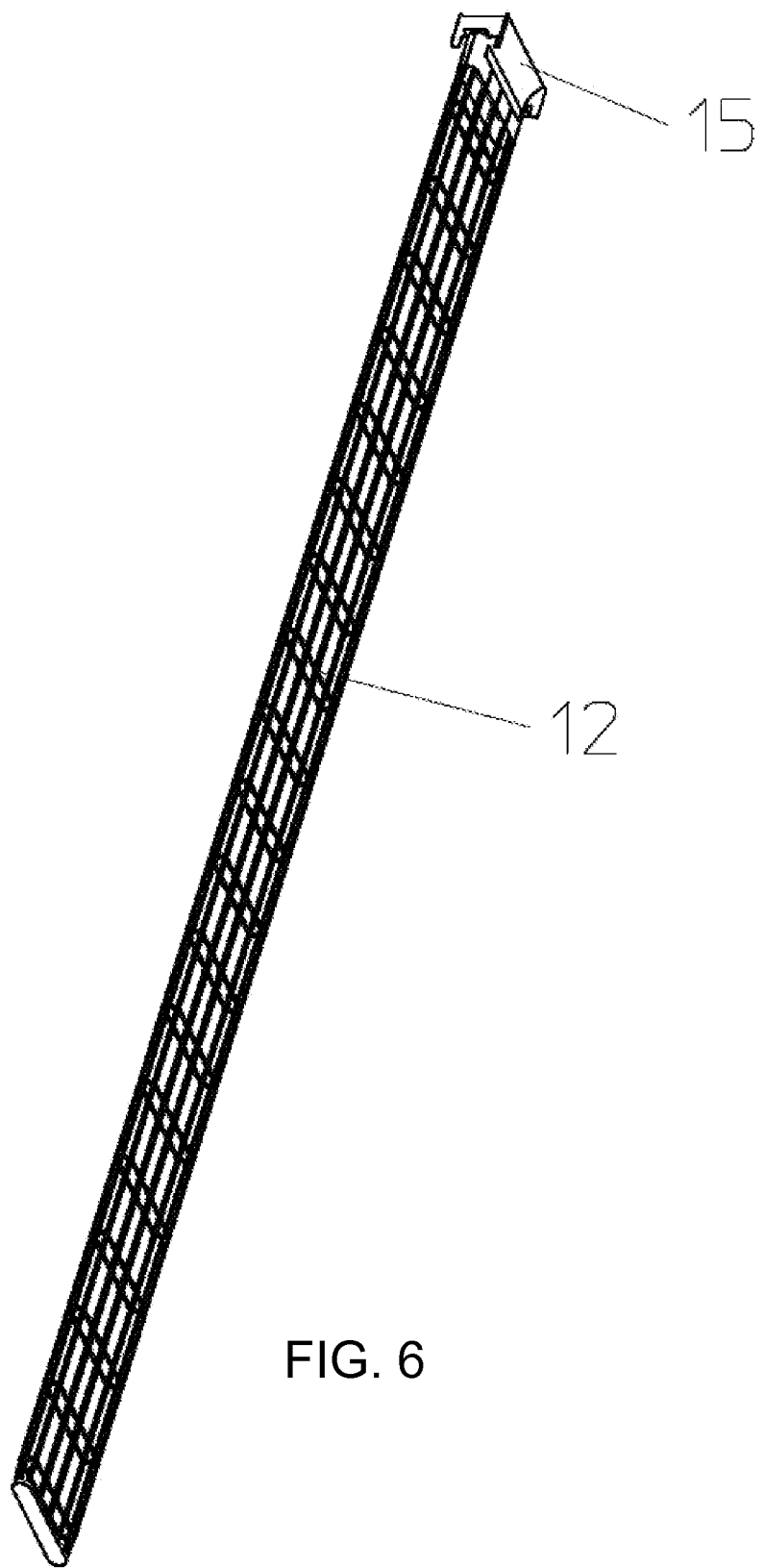
FIG. 6 shows a perspective view of an injector nozzle integrally formed with a support basket.

FIG. 6 shows an embodiment wherein the injector nozzle 15 and the support basket 12 are formed integrally. This type of construction allows a particularly swift mounting of the filter bags 4 within the bag filter while automatically sealing the filter bags 4 with respect to the openings 3 in the bag bottom 2 of the bag filter at the same time. An injector nozzle 15 of such design having an integrated support basket 12 combines the supporting function, the sealing function and the injector function of the bag filter.

In this way, application of a bag filter having filter bags 4 with flat cross-sections is possible without the drawbacks present in the prior art. By eliminating the disadvantages of bag filters having filter bags 4 with flat cross-sections, smaller filter systems than bag filters having filter bags with circular cross-sections can be used for providing equal cleaning effects.

The invention claimed is:

1. A bag filter assembly for cleaning dust-laden gases, comprising:
a housing;
a bag bottom disposed to divide said housing into a filtered-gas side and an unfiltered-gas side, said bag bottom having a plurality of openings formed therein;
a plurality of filter bags disposed in said openings, said filter bags having a flat cross-section, a closed end and an open end, wherein the dust-laden gases are to be applied to said filter bags from outside and cleaned gases are to discharged through said open ends;
elements for outputting compressed-air pulses into said open ends of said filter bags for dedusting said filter bags;
a respective support basket disposed in each said filter bag;
an injector nozzle connected to each support basket at an end thereof associated with said open end of the respective said filter bag, said injector nozzle being configured for conducting and accelerating the dedusting compressed-air pulses, and said injector nozzle protruding at least partially into a respective said opening of said bag bottom; and
sealing elements disposed on an outside of said injector nozzle at a level of said bag bottom to form a defined gap for a defined compression of said filter bag between said sealing elements and a jacket surface of said opening in said bag bottom and to thereby independently seal said filter bag with respect to said opening of said bag bottom.

2. The bag filter according to claim 1, wherein each said injector nozzle is formed with a funnel-shaped mouth expanding towards said elements for outputting of compressed-air pulses.

3. The bag filter according to claim 2, wherein a ratio between a smallest width of said injector nozzle and a width of said mouth of said injector nozzle lies between 1:2 and 1:4.

4. The bag filter according to claim 3, wherein the ratio between the smallest width of said injector nozzle and the width of said mouth of said injector nozzle is 1:2.5.

5. The bag filter according to claim 1, wherein said sealing elements are formed by at least one bulge on said injector nozzle pressing said filter bag against the jacket surface of said opening in said bag bottom.

6. The bag filter according to claim 1, wherein each said filter bag is provided with a ring-shaped ridge on an outside at said open end, said ring-shaped ridge resting on said bag bottom.

7. The bag filter according to claim 1, wherein the open end of each said filter bag is provided with a spring ring and two ring-shaped elevations on the outside, between which elevations a ring-shaped groove is formed for creating a snap fit with said opening in said bag bottom.

8. The bag filter according to claim 1, which comprises elements for resting against the bag bottom disposed on each said injector nozzle.

9. The bag filter according to claim 1, which comprises elements for the support baskets to rest on.

10. The bag filter according to claim 1, wherein said filter bags have a cross-section with a length-to-width ratio of at least 4:1.

11. The bag filter according to claim 1, wherein said elements for outputting compressed-air pulses are blowing jet pipes, each having two openings arranged adjacent each other per filter bag, and each blowing jet pipe is connected to a compressed air source.

12. The bag filter according to claim 1, wherein each said support basket is releasably connected to said injector nozzle for releasing same manually without the use of tools.

13. An injector nozzle assembly for a filter bag of a bag filter for cleaning dust-laden gases, the bag filter having a housing that is divided into a filtered-gas side and an unfiltered-gas side by a bag bottom having openings, in which housing a plurality of filter bags having a flat cross-section and a closed end and an open end are disposed in the openings of the bag bottom, wherein the dust-laden gases may be applied to the filter bags from the outside and cleaned gases are discharged through the open ends, and the bag filter further has elements for the output of compressed-air pulses into the open ends of the filter bags for dedusting the filter bags, the injector nozzle assembly comprising:

an injector nozzle protruding at least partially into the opening of the bag bottom;

sealing elements disposed, in an operating position, on an outside of said injector nozzle at a level of the bag bottom, said sealing elements forming a defined gap for a defined compression of the filter bag between said sealing elements and the jacket surface of the opening in the bag bottom and thus to independently seal the filter bag with respect to the opening of the bag bottom.

14. The injector nozzle assembly according to claim 13, wherein said injector nozzle is formed with a funnel-shaped mouth expanding towards the elements for the output of compressed-air pulses.

15. The injector nozzle assembly according to claim 14, wherein a ratio between a smallest width of said injector nozzle and a width of said mouth of the injector nozzle is between 1:2 and 1:4.

16. The injector nozzle assembly according to claim 15, wherein the ratio between the smallest width of said injector nozzle and the width of said mouth is 1:2.5.

17. The injector nozzle assembly according to claim 13, wherein said sealing elements are formed by at least one bulge on said injector nozzle for pressing the filter bag against the jacket surface of the opening in the bag bottom.

18. The injector nozzle assembly according to claim 13, which comprises elements for resting against the bag bottom.

19. The injector nozzle assembly according to claim 13, which comprises elements for the connection to a support basket releasably without the use of tools.

20. The bag filter according to claim 1, wherein said flat cross-section has longitudinal sides, said sealing elements on the outside of said injector nozzle press the longitudinal sides of said filter bag against said jacket surface of said opening in said bag bottom.

\* \* \* \* \*